(12) United States Patent
Saito

(10) Patent No.: US 8,632,057 B2
(45) Date of Patent: *Jan. 21, 2014

(54) DIAPHRAGM CARBURETOR

(71) Applicant: U.S.A. Zama, Inc., Franklin, TN (US)

(72) Inventor: Tamotsu Saito, Iwate (JP)

(73) Assignee: Zama Japan Kabushiki Kaisha, Iwate (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/676,055

(22) Filed: Nov. 13, 2012

(65) Prior Publication Data

US 2013/0119568 A1    May 16, 2013

Related U.S. Application Data

(62) Division of application No. 12/621,369, filed on Nov. 18, 2009, now Pat. No. 8,308,144.

(51) Int. Cl.
   *F02M 15/06*    (2006.01)
(52) U.S. Cl.
   USPC .. 261/35; 261/152; 261/DIG. 8; 261/DIG. 81
(58) Field of Classification Search
   USPC ............ 261/35, 141, 143, 144, 152, DIG. 81, 261/DIG. 83, DIG. 8
   See application file for complete search history.

(56) References Cited

U.S. PATENT DOCUMENTS

| | | | | |
|---|---|---|---|---|
| 1,974,586 A | * | 9/1934 | Prentiss | 123/540 |
| 2,134,877 A | * | 11/1938 | Jedrzykowski | 261/41.5 |
| 2,615,696 A | * | 10/1952 | Winkler | 261/41.5 |
| 3,196,926 A | * | 7/1965 | Gartland | 137/339 |
| 3,628,516 A | * | 12/1971 | Perrin et al. | 123/541 |
| 4,036,188 A | * | 7/1977 | Sami et al. | 123/41.31 |
| 4,084,564 A | * | 4/1978 | Rickert | 123/514 |
| 4,098,236 A | * | 7/1978 | Okawa | 123/41.02 |
| 4,364,355 A | * | 12/1982 | Karino | 123/438 |
| 4,499,032 A | * | 2/1985 | Shibano | 261/72.1 |
| 4,716,878 A | * | 1/1988 | Shimada et al. | 123/540 |
| 4,752,420 A | * | 6/1988 | Nagasaka et al. | 261/35 |
| 4,768,492 A | * | 9/1988 | Widmer et al. | 123/541 |
| 4,769,185 A | * | 9/1988 | Nagasaka et al. | 261/35 |
| 4,941,999 A | * | 7/1990 | Noisier | 261/130 |
| 5,195,493 A | * | 3/1993 | Re | 123/510 |

(Continued)

FOREIGN PATENT DOCUMENTS

JP    59-15658 A    *    1/1984    ............ 261/DIG. 81
JP    4-7703 A    *    1/1992

*Primary Examiner* — Richard L Chiesa
(74) *Attorney, Agent, or Firm* — Kenneth S. Roberts; One LLP

(57) ABSTRACT

The present invention provides a diaphragm carburetor wherein heat transferred from the engine to the carburetor through the insulator is reduced to lower the temperature of the carburetor unit and reduce the occurrence of bubbles in the fuel. The carburetor of the present invention is a diaphragm carburetor in which a fuel channel that extends from a pump chamber of the carburetor to a constant-pressure fuel chamber is divided into two branches to form one branch as a main fuel channel connected to the constant-pressure fuel chamber, and the other branch as a fuel circulation channel for passing the fuel through the body side surface of the carburetor on the insulator side, or the body side surface of the insulator on the carburetor side, causing the fuel to make a circuit around the carburetor, and returning the fuel to the fuel tank.

17 Claims, 4 Drawing Sheets

(56) References Cited

U.S. PATENT DOCUMENTS

| | | | | |
|---|---|---|---|---|
| 6,644,631 B2 * | 11/2003 | Suzuki | | 261/35 |
| 7,309,061 B2 * | 12/2007 | Araki | | 261/35 |
| 8,308,144 B2 * | 11/2012 | Saito | | 261/35 |
| 2005/0179146 A1 * | 8/2005 | Iwasa et al. | | 261/35 |
| 2007/0023934 A1 * | 2/2007 | Paa | | 261/34.2 |
| 2011/0115106 A1 * | 5/2011 | Saito | | 261/141 |

* cited by examiner

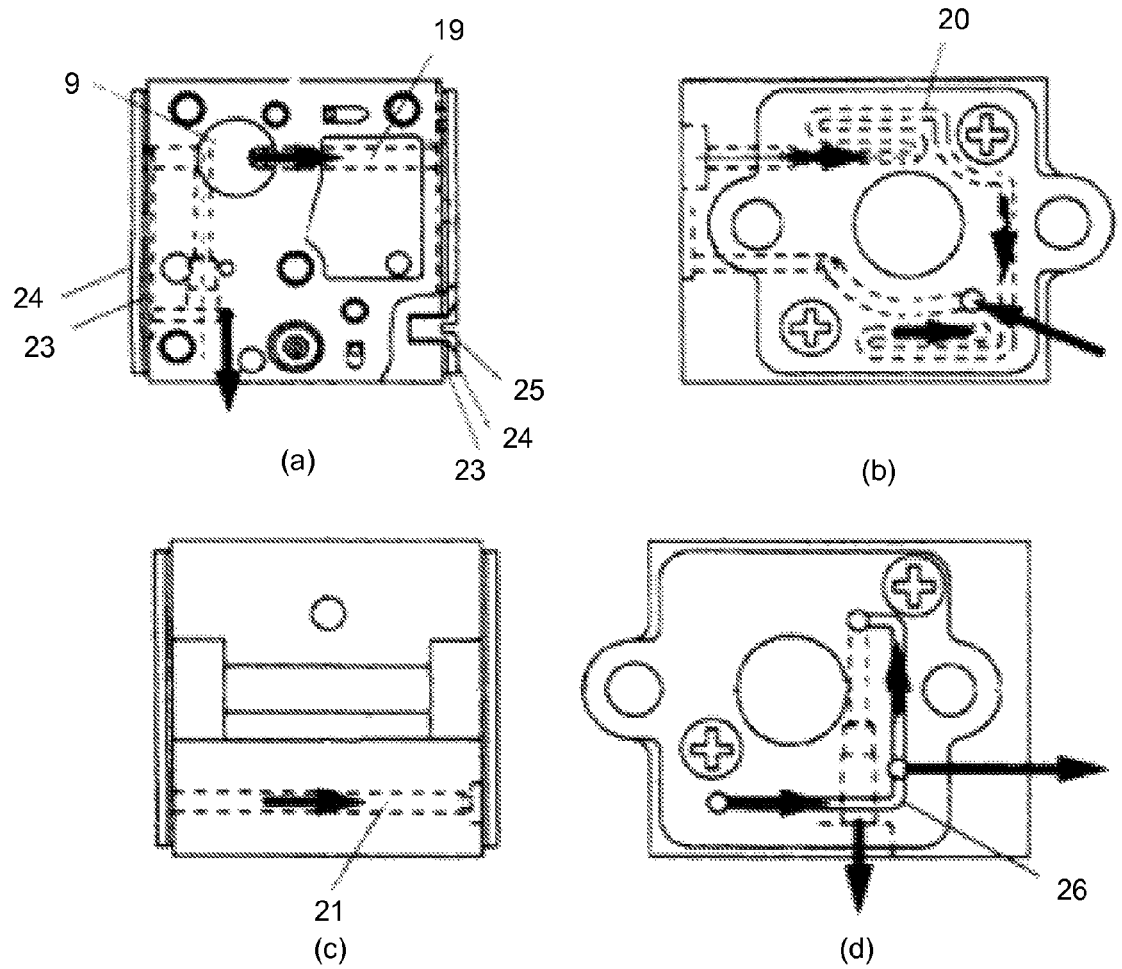
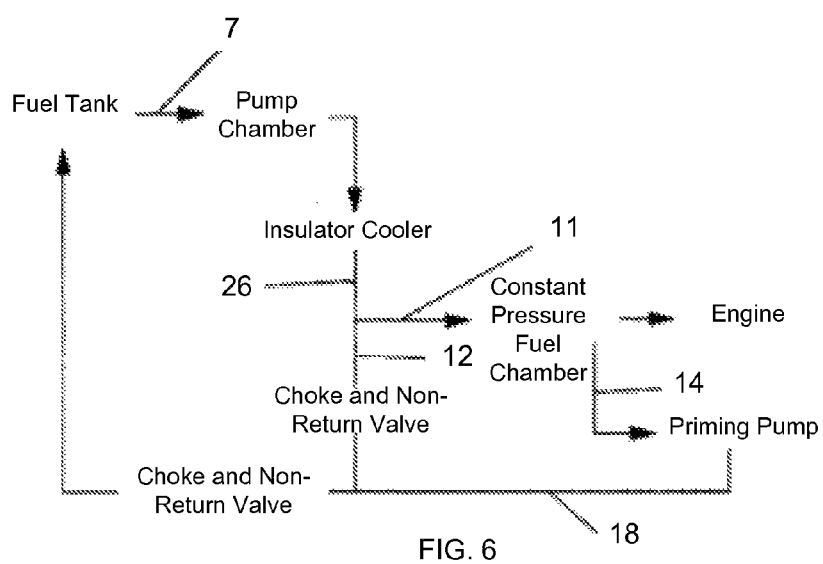
FIG. 6

DIAPHRAGM CARBURETOR

RELATED APPLICATION

This application is a divisional of U.S. application Ser. No. 12/621,369, filed Nov. 18, 2009, now U.S. Pat. No. 8,308,144.

BACKGROUND OF THE INVENTION

1. Field of the Invention

The present invention relates to a diaphragm carburetor wherein the temperature of the carburetor is lowered to reduce the occurrence of bubbles in the fuel.

2. Description of the Related Art

When bubbles occur in the fuel in the engine carburetor of a hand-held mower, hand-held trimmer, or the like, the rotation of the engine fluctuates, impeding work. Bubbles occur primarily when the temperature inside the carburetor is increased by various types of heat from the engine.

Usually, the carburetor unit is heated by heat generated by the engine when the engine is operated continuously, and the carburetor is cooled by the heat of vaporization of the fuel. The temperature of the carburetor is balanced by this simultaneous heating and cooling, and the carburetor is designed so that bubbles do not form in the fuel inside the carburetor in such a state.

However, as output has increased and fuel consumption decreased in modern low-emission engines, the amount of heat generated by the engine has increased. Despite this, the amount of cooling of the carburetor by the heat of vaporization has decreased, the temperature of the carburetor during operation has the tendency to increase gradually, and problems due to bubbles have become more prone to occur.

In a conventional fuel supply device for a floatless carburetor, the difference in temperature is reduced between the carburetor mounted to the engine and the fuel supplied from the fuel tank to the carburetor, and evaporation of the fuel in the carburetor is suppressed (see Japanese Patent No. 4007703).

In this publicly known technique, the fuel drawn from the fuel tank by the fuel pump passes through a fuel supply channel. In the process, the fuel passes through a fuel relay chamber that is formed integrally with an insulator, and since the insulator is somewhat heated by conduction of heat from the engine during prolonged operation of the engine, the fuel passing through the fuel relay chamber is also appropriately heated. Consequently, it is possible to reduce the difference in temperature between the fuel drawn out of the fuel relay chamber by the fuel pump of the carburetor and the carburetor that is heated to a relatively high temperature by the engine heat. As a result, sudden temperature changes of the fuel inside the carburetor can be prevented and evaporation of the fuel can be suppressed.

SUMMARY OF THE INVENTION

An object of the present invention is to provide a diaphragm carburetor wherein heat transferred from the engine to the carburetor through the insulator is reduced to lower the temperature of the carburetor and reduce the occurrence of bubbles in the fuel.

The carburetor of the present invention is a diaphragm carburetor for a multi-purpose machine, wherein fuel pumped by a pump chamber of a carburetor is divided into two branches so that one branch extends toward a constant-pressure fuel chamber and is a main fuel channel for feeding a fuel-air mixture needed for normal engine operation, and the other branch is a fuel circulation channel that extends toward an engine body or cylinder as a heat source, passes through while cooling the inside of an insulator and a portion of a carburetor unit closer to the heat source than the constant-pressure fuel chamber of the carburetor, and then returns to the fuel tank.

In the carburetor, fuel pumped by a pump chamber of the carburetor is divided into two branches from between a valve on the exit side of the pump chamber and a valve seat of a constant-pressure fuel chamber, one branch extending toward a main fuel channel, and the other branch extending toward a cooling channel for cooling a heat source.

In the carburetor, fuel pumped by a pump chamber of the carburetor is divided into two branches from between a valve on the exit side of the pump chamber and a measurement valve seat, one branch extending toward a main fuel channel, and the other branch extending toward a cooling channel for cooling a heat source.

In the carburetor, fuel pumped by a pump chamber of the carburetor is passed through a cooling channel that extends toward an engine body or cylinder, which acts as a heat source for the carburetor, and is divided into two branches so that one branch is a main fuel channel, and the other branch is a fuel circulation channel for returning to a fuel tank.

In the carburetor, a cooling channel for cooling the heat source is provided at the bottom of a body side surface on the throttle side of a carburetor unit.

The carburetor of the present invention is a diaphragm carburetor for a multi-purpose machine, wherein fuel pumped by a pump chamber of a carburetor is divided into two branches so that one branch extends toward a constant-pressure fuel chamber and is a main fuel channel for feeding a fuel-air mixture needed for normal engine operation, and the other branch is a fuel circulation channel that extends toward an engine body or cylinder as a heat source, passes through while cooling the inside of an insulator and a portion of a carburetor unit closer to the heat source than the constant-pressure fuel chamber of the carburetor, and then returns to the fuel tank. Therefore, heat conducted from the engine to the carburetor through the insulator is reduced to lower the temperature of the carburetor unit and reduce the occurrence of bubbles in the fuel.

In the carburetor of the present invention, fuel pumped by a pump chamber of the carburetor is divided into two branches from between a valve on the exit side of the pump chamber and a valve seat of a constant-pressure fuel chamber, one branch extending toward a main fuel channel, and the other branch extending toward a cooling channel for cooling a heat source; or fuel pumped by a pump chamber of the carburetor is passed through a cooling channel that extends toward an engine body or cylinder, which acts as a heat source for the carburetor, and is divided into two branches so that one branch is a main fuel channel, and the other branch is a fuel circulation channel for returning to a fuel tank. Therefore, heat conducted from the engine to the carburetor through the insulator is reduced to lower the temperature of the carburetor unit and reduce the occurrence of bubbles in the fuel.

BRIEF DESCRIPTION OF THE DRAWINGS

FIGS. 5(a) through 5(d) are side views showing the carburetor unit according to another embodiment;

FIG. 6 is a flow diagram showing another embodiment of the carburetor of the present invention;

DESCRIPTION OF THE PREFERRED EMBODIMENTS

An embodiment of the diaphragm carburetor of the present invention will be described based on the accompanying drawings.

Figure 1:
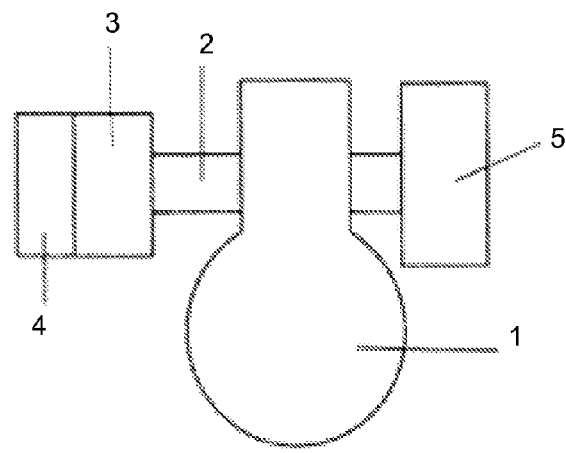
FIG. 1 is an outline view showing an engine.

FIG. 1 is an outline view showing the engine of a hand-held mower, a hand-held trimmer, or the like. A carburetor 3 is mounted to one side of an engine 1 via an insulator 2 that has an intake channel communicated with an intake port of the engine 1, and an air cleaner 4 is mounted to the entrance side of the intake of the carburetor 3. A muffler 5 connected to an exhaust port of the engine 1 is mounted to the other side of the engine 1. Although not shown in the drawing, a fuel tank is installed on the underside of the engine 1.

Figure 2:
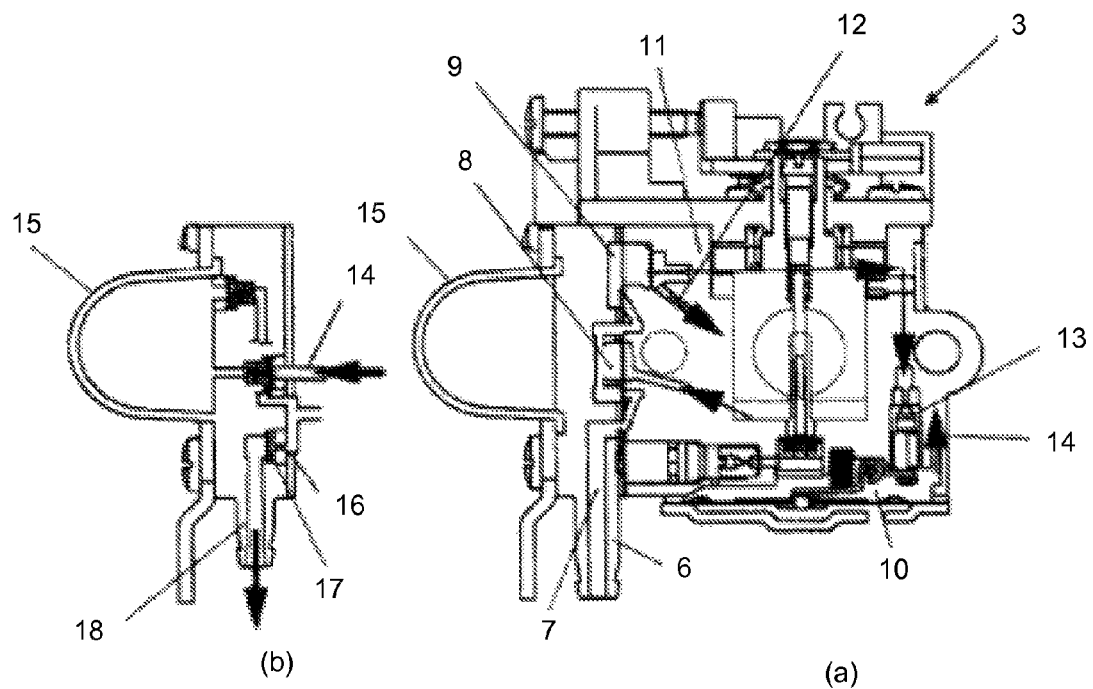
FIGS. 2(a) and 2(b) are longitudinal sectional views showing an embodiment of the diaphragm carburetor of the present invention.

FIGS. 2(a) and 2(b) are longitudinal sectional views showing the diaphragm carburetor of the present invention. In the carburetor 3, an entrance channel 6 shown in FIG. 2(a) is connected to a fuel supply channel for feeding fuel from a fuel tank (not shown), an upstream fuel channel 7 continues into the entrance channel 6, the upstream fuel channel 7 is communicated with a pump chamber 8, a downstream fuel channel 9 continues into the pump chamber 8, and the downstream fuel channel 9 is divided into two branches to form one branch as a main fuel channel 11 connected to a constant-pressure fuel chamber 10, and the other branch as a fuel circulation channel 12. The main fuel channel 11 is communicated with the constant-pressure fuel chamber 10 via a fuel control valve 13, and fuel is fed to the engine 1 from the constant-pressure fuel chamber 10.

Through the operation of a priming pump at the time of starting, excess fuel in the constant-pressure fuel chamber 10 flows from the constant-pressure fuel chamber 10 to a return channel 14 shown in FIG. 2(b), and then from a primer syringe 15 to a discharge channel 18 via a choke 16 and a non-return valve 17, and returns from the discharge channel 18 through a fuel drainage channel (not shown).

Figure 3:
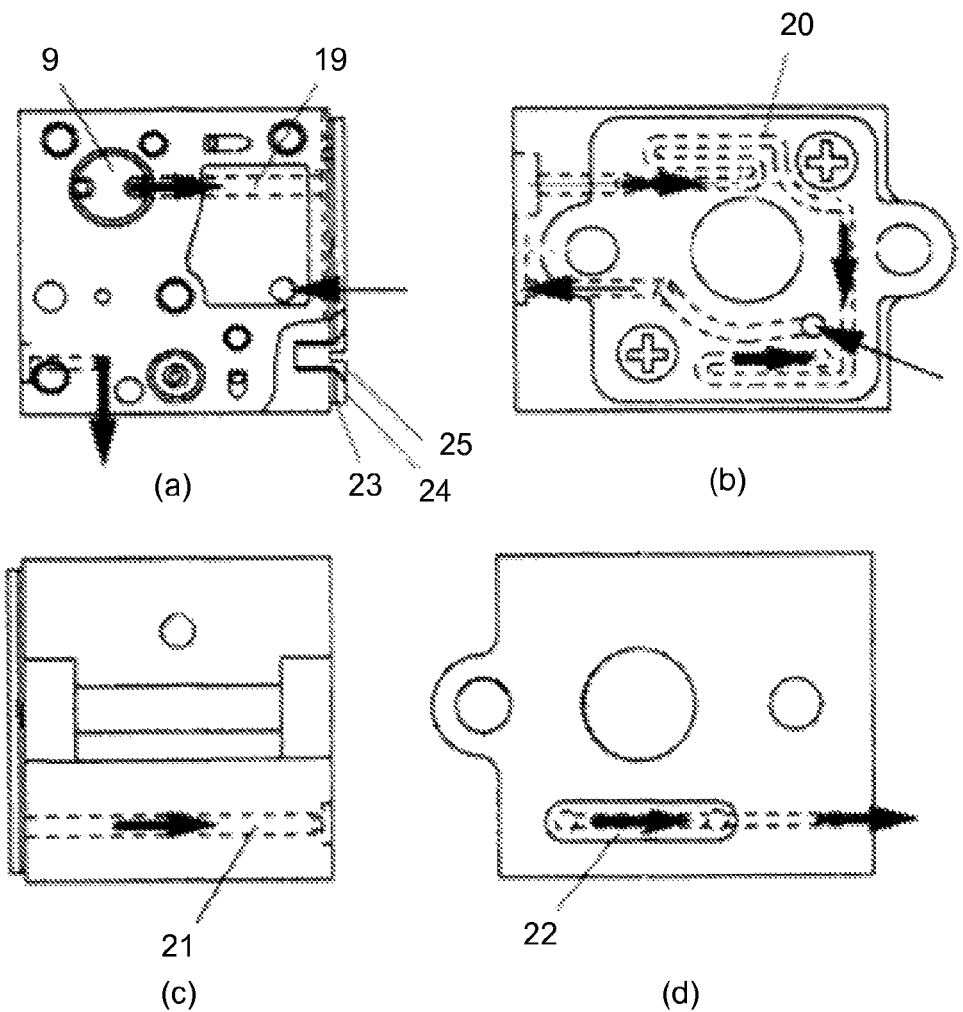
FIGS. 3(a) through 3(d) are side views showing an embodiment of the carburetor unit.
Figure 7:
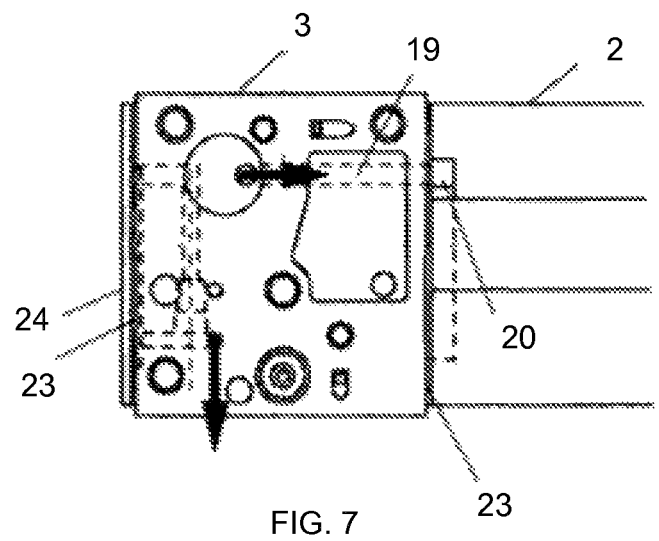
FIG. 7 is a side view showing the circulation fuel channel according to another embodiment.

FIGS. 3(a) through 3(d) are side views showing the carburetor unit of the present invention. As shown in FIG. 3(a), an opening is formed in a mounting surface of the insulator 2 via a first through-channel 19 bored along a mounting surface of the primer syringe 15 from the downstream fuel channel 9. As shown in FIG. 3(b), a meandering groove 20 communicated with the aforementioned opening is formed along the surface by which the carburetor 3 is mounted to the insulator 2, or along the body side surface of the insulator 2 on the carburetor side, as shown in FIG. 7. As shown in FIG. 3(c), a second through-channel 21 bored along the surface opposite the mounting surface of the primer syringe 15 is furthermore provided at the terminal end of the meandering groove 20 and, as shown in FIG. 3(d), is formed so as to be communicated with the discharge channel 18 of the mounting surface of the primer syringe 15 through a feeding groove 22 in the mounting surface of the air cleaner 4.

The meandering groove 20 or feeding groove 22 is covered by a cover 24 via a seal member 23 on the external periphery thereof, and the cover 24 is fixed to the carburetor 3 by a cover fixing screw 25 to form a cooling channel.

The circulation channel 12 is formed so as to pass through the body side surface on the insulator side of the carburetor 3 as shown in FIG. 3(b), or the body side surface of the insulator 2 on the carburetor side as shown in FIG. 7, and return to the fuel tank.

The operation of the embodiment of the carburetor of the present invention will next be described based on the accompanying drawings.

Figure 4:
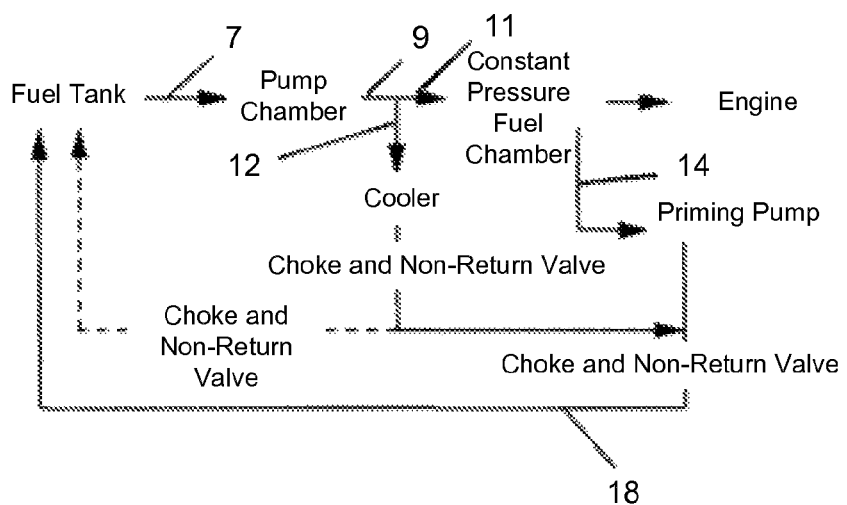
FIG. 4 is a flow diagram showing an embodiment of the carburetor of the present invention.

FIG. 4 is a flow diagram showing an embodiment of the carburetor of the present invention. The upstream fuel channel 7 extends from the fuel tank to the pump chamber 8 of the diaphragm carburetor; the downstream fuel channel 9 (between the valve on the exit side of the pump chamber and the valve seat of a constant-pressure fuel chamber) that extends from the pump chamber 8 of the diaphragm carburetor to the constant-pressure fuel chamber 10 is divided into two branches so that one branch connects to the constant-pressure fuel chamber 10, which is a conventional main fuel channel 11, and the other branch passes as a cooler through the body side surface of the carburetor 3 on the insulator side, or the body side surface of the insulator 2 on the carburetor side; and the fuel circulation channel 12 is provided for returning the fuel from the discharge channel 18 to the fuel tank of the engine 1, the fuel circulation channel 12 being communicated with the discharge channel 18 of excess fuel for priming.

Fuel that passes through the conventional main fuel channel 11 connected to the constant-pressure fuel chamber 10 passes through the carburetor 3 in the same manner as in a regular carburetor, and is mixed with air and fed to the engine 1. The excess fuel that occurs in the constant-pressure fuel chamber 10 due to operation of the priming pump at the time of starting passes through the priming pump 15 from the constant-pressure fuel chamber 10 and returns to the fuel tank from the discharge channel 18. The fuel that flows to the fuel circulation channel 12 of the other branch flows along the body side surface of the carburetor 3 on the insulator side of the engine 1, or the body side surface of the insulator 2 on the carburetor side, and returns to the fuel tank after absorbing heat that is transferred through the insulator 2 to the carburetor 3.

When the fuel tank is full, a large quantity of fuel having a lower temperature than the fuel warmed on the side of the carburetor unit is stored in the fuel tank, and even when there is a small quantity of fuel in the fuel tank, the fuel warmed by the insulator 2 is adequately cooled to or below the temperature of the insulator 2 by the inside of the fuel tank because the fuel tank has a large surface area. The fuel cooled by the fuel tank is drawn in again by the pump action of the carburetor 3, is made to absorb the heat conducted from the engine 1, and is discharged in the fuel tank. By circulating the fuel in a manner such as described above, heat transfer from the engine 1 to the carburetor 3 can be reduced and a low temperature can be stably maintained.

In order to ensure that there is sufficient fuel inside a regular carburetor so that engine performance is not hindered, a choke for pressure adjustment, or a non-return valve for ensuring that fuel is efficiently drawn in from the constant-pressure fuel chamber 10 by the priming operation, is provided to the fuel circulation channel 12 on the insulator cooling side.

Another embodiment of the diaphragm carburetor of the present invention will next be described based on the accompanying drawings.

FIGS. 5(a) through 5(d) are side views showing the carburetor unit of the present invention. As shown in FIG. 5(a), an opening is formed in a mounting surface of the insulator 2 via a first through-channel 19 bored along a mounting surface of the primer syringe 15 from the downstream fuel channel 9. As shown in FIG. 5(b), a meandering groove 20 communicated with the aforementioned opening is formed along the mounting surface of the carburetor 3 on insulator side, or along a body side surface of the insulator 2 on the carburetor side. As shown in FIG. 5(c), a second through-channel 21 bored along the surface opposite the mounting surface of the primer syringe 15 is furthermore provided at the terminal end of the meandering groove 20 and, as shown in FIG. 5(d), is formed so as to pass through a branching channel 26 in the mounting surface of the air cleaner 4, one branch extending toward the constant-pressure fuel chamber 10 and the other branch being communicated with the discharge channel 18 of excess fuel for priming.

The fuel circulation channel 12 is thus formed so as to pass through the body side surface of the carburetor 3 on the insulator side, or the body side surface of the insulator 2 on the carburetor side, as shown in FIGS. 5(a) through 5(d), and after cooling, branch at the branching channel 26 into one branch that extends toward the constant-pressure fuel chamber 10 and another branch that extends halfway around the carburetor 3 and returns to the fuel tank.

The meandering groove 20 or branching channel 26 is covered by a cover 24 via a seal member 23 on the external periphery thereof, and the cover 24 is fixed to the carburetor 3 by a cover fixing screw 25 to form a cooling channel.

The operation of the other embodiment of the carburetor of the present invention will next be described based on the accompanying drawings.

FIG. 6 is a flow diagram showing the other embodiment of the carburetor of the present invention. The upstream fuel channel 7 extends from the fuel tank to the pump chamber 8 of the diaphragm carburetor; the branching channel 26 that extends from the pump chamber 8 of the diaphragm carburetor to the constant-pressure fuel chamber 10 divides into two branches after passing, as an insulator cooler, the body side surface of the carburetor 3 on the insulator side, or the body side surface of the insulator 2 on the carburetor side, one branch being connected to the constant-pressure fuel chamber 10 as a conventional main fuel channel 11, and the other branch being communicated with the discharge channel 18 of excess fuel; and the fuel circulation channel 12 is provided for returning to the fuel tank of the engine 1.

Fuel traveling through the conventional main fuel channel 11 connected to the constant-pressure fuel chamber 10 passes through the carburetor 3 in the same manner as in a regular carburetor, and is mixed with air and fed to the engine 1.

The excess fuel that occurs in the constant-pressure fuel chamber 10 due to operation of the priming pump at the time of starting passes through the priming pump 15 and returns to the fuel tank from the discharge channel 18.

The fuel that flows through the insulator cooler flows along the body side surface of the carburetor 3 on the insulator side of the engine 1, or the body side surface of the insulator 2 on the carburetor side, and returns to the fuel tank from the discharge channel 18 of excess fuel after absorbing heat that is transferred through the insulator 2 to the carburetor 3.

When the fuel tank is full, a large quantity of fuel having a lower temperature than the fuel warmed on the side of the carburetor unit is stored in the fuel tank, and even when there is a small quantity of fuel in the fuel tank, the fuel warmed by the insulator 2 is adequately cooled to or below the temperature of the insulator 2 by the inside of the fuel tank because the fuel tank has a large surface area.

The fuel cooled by the fuel tank is drawn in again by the pump action of the carburetor 3, the fuel absorbs the heat conducted from the engine 1, and the fuel is discharged in the fuel tank. By circulating the fuel in a manner such as described above, heat transfer from the engine 1 to the carburetor 3 can be reduced, and a low temperature can be stably maintained.

In order to ensure that there is sufficient fuel inside a regular carburetor so that engine performance is not hindered, a non-return valve or a choke for pressure adjustment is provided to the fuel circulation channel 12 on the insulator cooling side.

Figure 8:
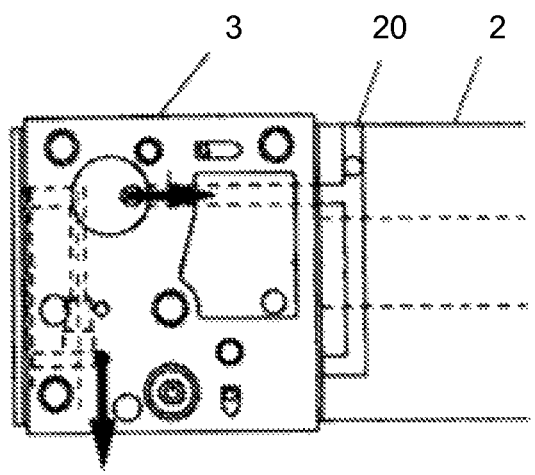
FIG. 8 is a side view showing the circulation fuel channel according to another embodiment.
Figure 9:
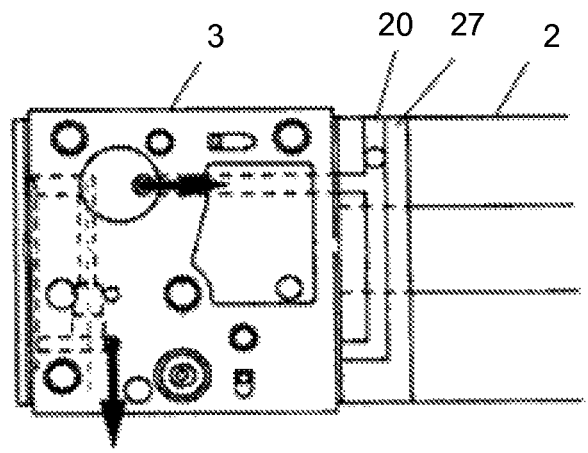
FIG. 9 is a side view showing the circulation fuel channel according to another embodiment.

As another embodiment, a cooling channel for cooling the heat source may be provided at the bottom of the body side surface on the throttle side of the carburetor unit, the meandering groove 20 may be provided inside the insulator 2 rather than in the carburetor 3 to form the cooling channel shown in FIG. 8, and a spacer 27 provided with a cooling channel formed from aluminum or another metal having high thermal conductivity may be sandwiched between the carburetor 3 and the insulator 2, as shown in FIG. 9.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

What is claimed is:

1. A diaphragm carburetor of a multi-purpose machine, wherein fuel pumped by a pump chamber of the carburetor is divided into two branches so that one branch extends toward a constant-pressure fuel chamber and is a main fuel channel for feeding a fuel-air mixture needed for normal engine operation, and the other branch is a fuel circulation channel that extends toward an engine body or cylinder as a heat source, passing through while cooling the inside of an insulator and a portion of the carburetor closer to the heat source than the constant-pressure fuel chamber of the carburetor, and then returns to a fuel tank;

wherein fuel pumped by the pump chamber of the carburetor is passed through a cooling channel that extends toward the engine body or cylinder, which acts as the heat source for the carburetor, and is divided into two branches so that one branch is the main fuel channel, and the other branch is the fuel circulation channel for returning to the fuel tank, wherein the fuel warmed by the insulator is adequately cooled to or below the temperature of the insulator by the inside of the fuel tank.

2. The carburetor of claim 1, wherein the cooling channel is provided at the bottom of a body side surface on a throttle side of the carburetor.

3. The carburetor of claim 1, wherein the multi-purpose machine is a hand-held mower.

4. The carburetor of claim 1, wherein the multi-purpose machine is a hand-held trimmer.

5. The carburetor of claim 1, wherein an excess fuel in the constant-pressure fuel chamber flows from the constant-pressure fuel chamber to a return channel, and then from a primer syringe to a discharge channel, and returns from the discharge channel through a fuel drainage channel.

6. The carburetor of claim 5, wherein the excess fuel flows from the primer syringe to the discharge channel via a choke and a non-return valve.

7. The carburetor of claim 1, wherein the fuel circulation channel is provided for communicating with a discharge channel and returning the fuel from the discharge channel to the fuel tank.

8. The carburetor of claim 1, wherein the fuel cooled by the fuel tank is made to absorb the heat conducted from the engine and is discharged in the fuel tank so that the heat transfer from the engine to the carburetor can be reduced and a low temperature can be stably maintained.

9. A diaphragm carburetor of a multi-purpose machine comprising:
   an entrance channel coupled to a fuel supply channel for feeding fuel from a fuel tank;
   an upstream fuel channel coupled to the entrance channel and a pump chamber; and
   a downstream fuel channel coupled to the pump chamber, wherein the downstream fuel channel is divided into two branches to form one branch as a main fuel channel coupled to a constant-pressure fuel chamber, and the other branch as a fuel circulation channel that extends toward an engine body or cylinder as a heat source, passing through while cooling the inside of an insulator and a portion of the carburetor closer to the heat source than the constant-pressure fuel chamber of the carburetor, and then returns to a fuel tank,
   wherein fuel pumped by the pump chamber of the carburetor is passed through a cooling channel that extends toward the engine body or cylinder, which acts as the heat source for the carburetor, and is divided into two branches so that one branch is the main fuel channel, and the other branch is the fuel circulation channel for returning to the fuel tank.

10. The carburetor of claim 9, wherein the cooling channel is provided at the bottom of a body side surface on a throttle side of the carburetor.

11. The carburetor of claim 9, wherein the multi-purpose machine is a hand-held mower.

12. The carburetor of claim 9, wherein the multi-purpose machine is a hand-held trimmer.

13. The carburetor of claim 9, wherein the insulator has a mounting surface, wherein an opening is formed in the mounting surface via a first through-channel bored along a mounting surface of a primer syringe.

14. The carburetor of claim 13, wherein a meandering groove communicated with the opening is formed along the surface by which the carburetor is mounted to the insulator.

15. The carburetor of claim 14, wherein a second through-channel bored along the surface opposite the mounting surface of the primer syringe is furthermore provided at the terminal end of the meandering groove, and is formed so as to be communicated with a discharge channel of the mounting surface of the primer syringe through a feeding groove in the mounting surface of an air cleaner.

16. The carburetor of claim 15, wherein the meandering groove is covered by a cover via a seal member on the external periphery thereof, wherein the cover is fixed to the carburetor by a cover fixing screw to form a cooling channel.

17. The carburetor of claim 16, wherein the circulation channel is formed so as to pass through the body side surface on the insulator side of the carburetor and return to the fuel tank.

* * * * *